(12) United States Patent
Markham et al.

(10) Patent No.: US 6,907,900 B2
(45) Date of Patent: Jun. 21, 2005

(54) PRESSURE REGULATED, SAFETY BYPASS VALVED, BOTTLE ADAPTED FITTING FOR LEVER ACTUATED RELEASE OF A REGULATED GAS

(76) Inventors: Trevor K. Markham, 4744 Center Park Blvd., San Antonio, TX (US) 78218; Glen M. Arnott, 4744 Center Park Blvd., San Antonio, TX (US) 78218

( * ) Notice: Subject to any disclaimer, the term of this patent is extended or adjusted under 35 U.S.C. 154(b) by 287 days.

(21) Appl. No.: 10/154,355

(22) Filed: May 23, 2002

(65) Prior Publication Data

US 2003/0217774 A1 Nov. 27, 2003

(51) Int. Cl.$^7$ .............................................. F16K 21/00
(52) U.S. Cl. ............. 137/613; 137/505.11; 137/505.25; 137/116.5
(58) Field of Search ................................. 137/613, 505, 137/505.11, 505.13, 505.25, 505.28, 116.5

(56) References Cited

U.S. PATENT DOCUMENTS

| | | | |
|---|---|---|---|
| 5,531,254 A | * | 7/1996 | Rosenbach .................. 141/113 |
| 5,544,670 A | | 8/1996 | Phillips et al. |
| 5,590,686 A | | 1/1997 | Prendergast |
| 5,803,101 A | | 9/1998 | Gallo |
| 5,996,597 A | | 12/1999 | Gallo |

* cited by examiner

*Primary Examiner*—Kevin Lee
(74) *Attorney, Agent, or Firm*—Jackson Walker, LLP (57) ABSTRACT

A fitting for engagement with a cylindrical compressed gas bottle. The fitting includes a valve for regulating gas between a regulated port of the body of the fitting and an outlet port of the body of the fitting. The body of the fitting is cylindrical and dimensioned to be hand held, the fitting includes a handle for pivotal engagement with the body, the handle to control the flow of gas from the outlet port.

20 Claims, 8 Drawing Sheets

PRESSURE REGULATED, SAFETY BYPASS VALVED, BOTTLE ADAPTED FITTING FOR LEVER ACTUATED RELEASE OF A REGULATED GAS

FIELD OF INVENTION

Regulated valves for regulating high-pressure gas from a small, lightweight steel bottle, more specifically a regulator valve shaped to be hand held with fingertip control.

BACKGROUND

Compressed gas often comes in bottles, typically small, lightweight, cylindrical, aluminum or steel bottles, with threaded or unthreaded necks. The cylinders may be for one time use (having a puncturable membrane) or refillable (typically valved). Carbon dioxide is often the gas under compression in the cylinder for use in a variety of devices including, for example, compressed gas powered guns. There has recently developed a need for small, lightweight valves to safely valve the gas provided by the small, lightweight, compressed gas cylinders. Prior art typically provides an unregulated on/off valve for engagement with such bottles. Some of the prior art discloses level held bottle/valve units wherein the fingers of ones hand, typically the hand holding the unit, may operate the valve. However, the prior are does not disclose a hand held unit wherein the valve will provide regulated gas to an output part, while retaining the hand held size and finger valve control.

SUMMARY OF THE INVENTION applicants provide a novel fitting that will regulate pressure from a small, lightweight cylindrical bottle to an outlet port and, further, will provide pressure relief to prevent internal gas pressure buildup. Applicants' novel fitting includes a safety blow-tip connection with gas sealing (as by an O-ring) behind the croasholes of the blow-tip connection. Applicants' novel pressure regulated fitting includes a shaped cap for ease of grasping in one's hand with a lever actuated valve for fingertip control of the regulated gas to the safety blow-tip connection.

Applicants' novel fitting will thread on and thread off a small disposable bottle of compressed gas, typically to the neck of the compressed gas bottle and provide a convenient handheld operation with fingertip control of the regulated gas. That is, these and other features set forth herein and apparent from the specifications are all provided in a handheld regulator fitting with fingertip control for engagement with a pressurized gas cylinder.

DETAILED DESCRIPTION OF THE PREFERRED EMBODIMENT

Figure 1:
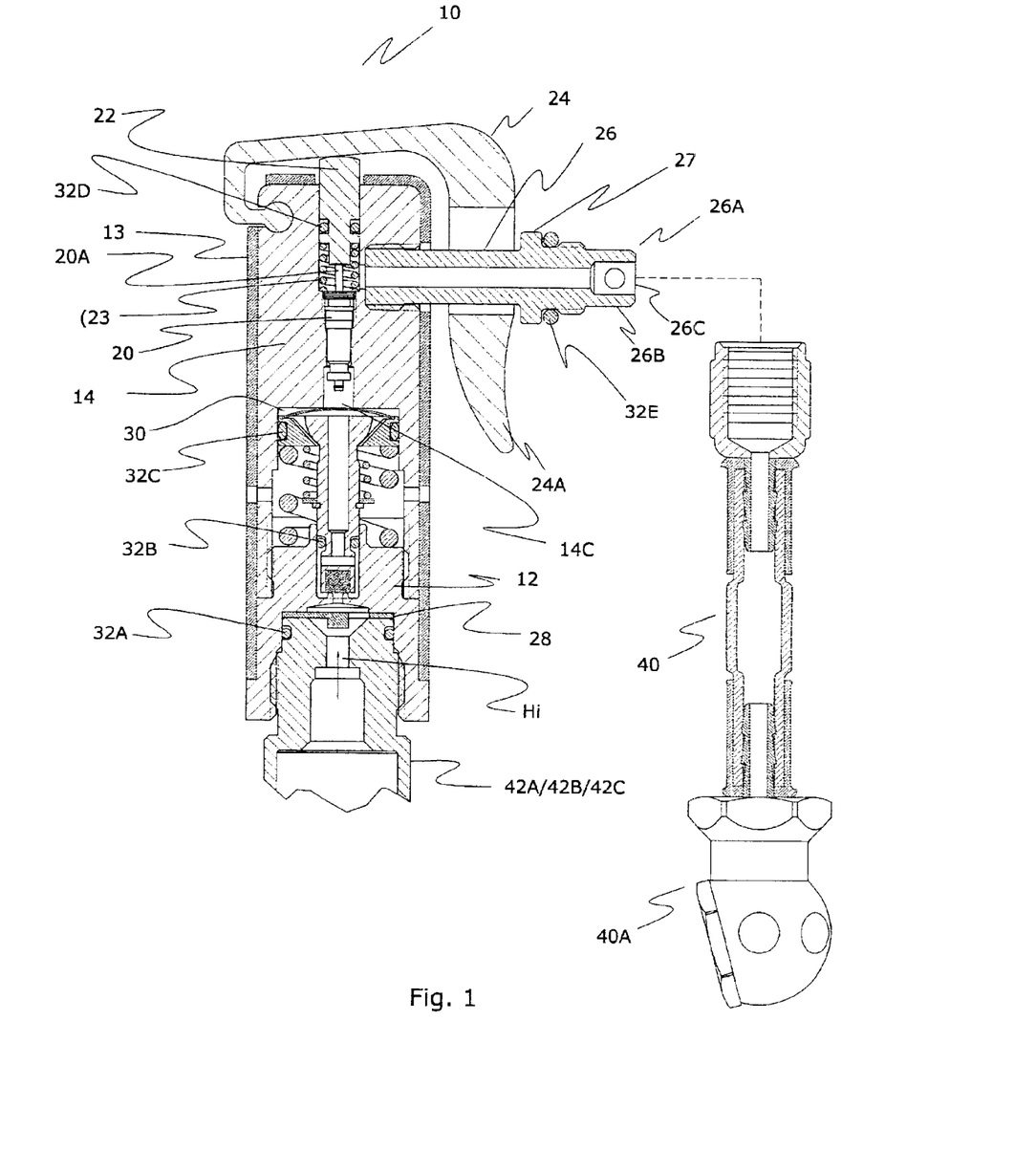
FIG. 1 is a side, cutaway, elevational view of Applicants' novel pressure fitting device (10) as threaded to an adaptor (42A–42B–42C), and engageable with a flexible hose (40). This figure illustrates the seat on the regulated port.
Figure 2:
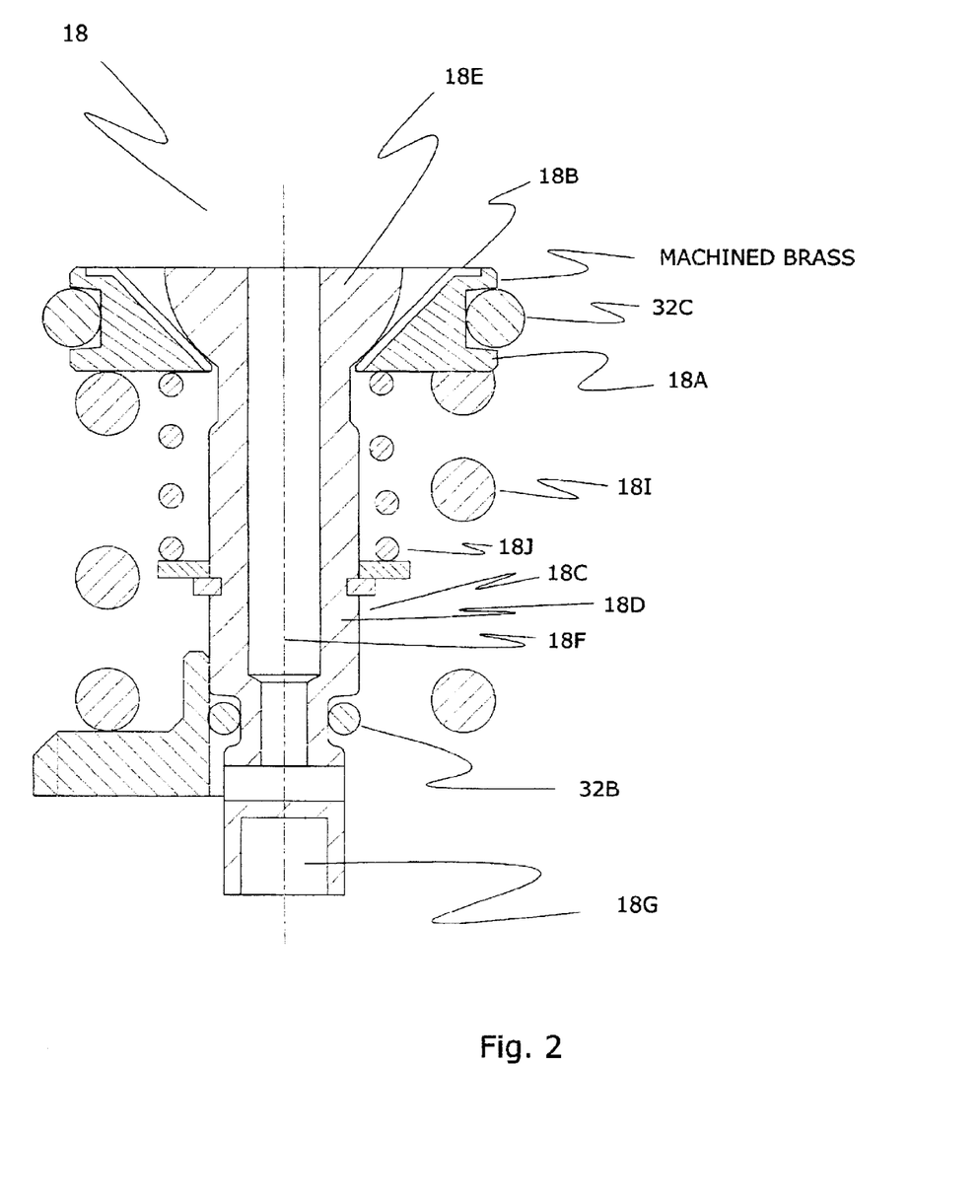
FIG. 2 is a side elevational view, cutaway, of the valve or regulator assembly of Applicants' novel system.
Figure 3:
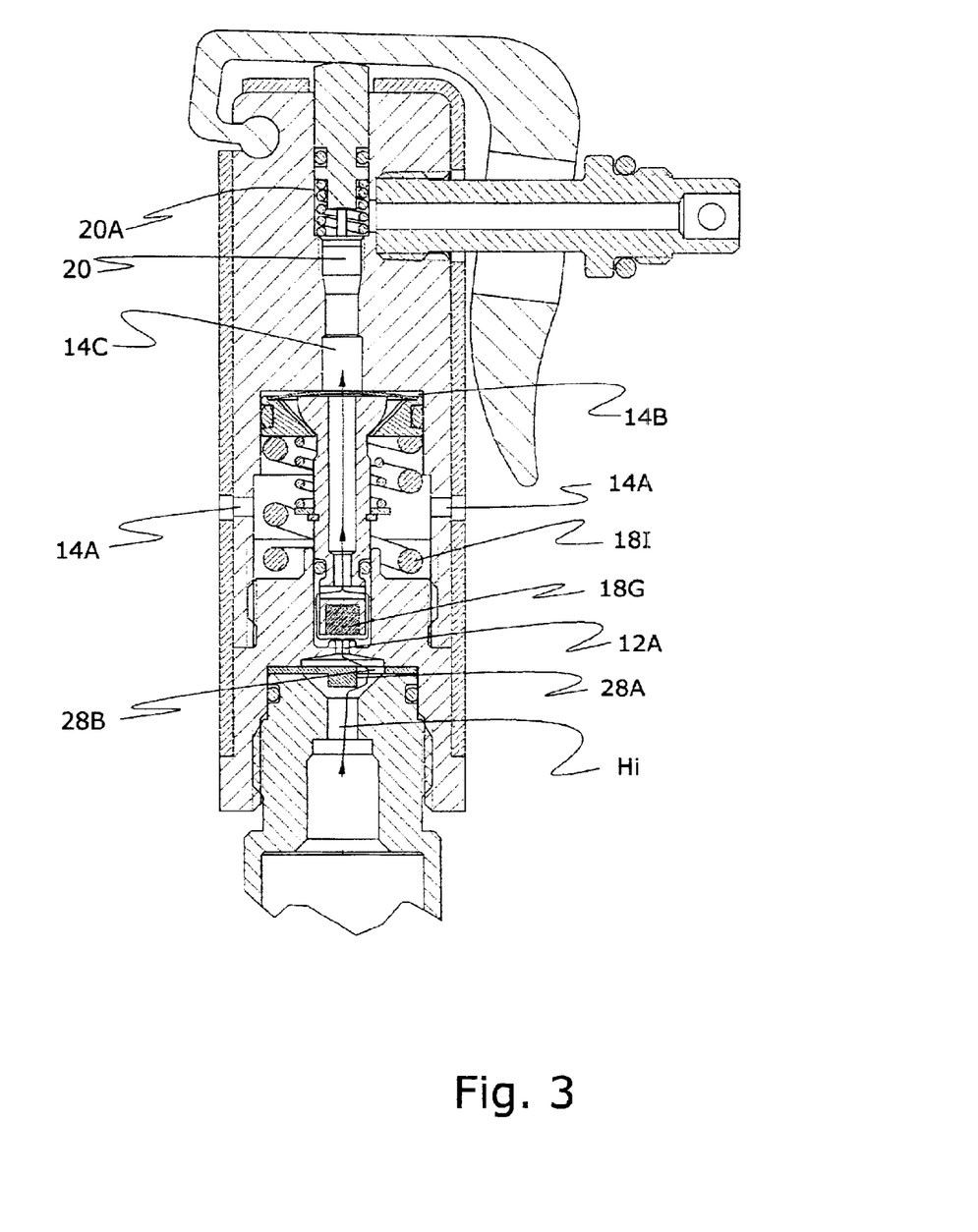
FIG. 3 is an illustration of the view as set forth in FIG. 1 showing, however, the seat off the regulated port and the gas flowing through the device.
Figure 4:
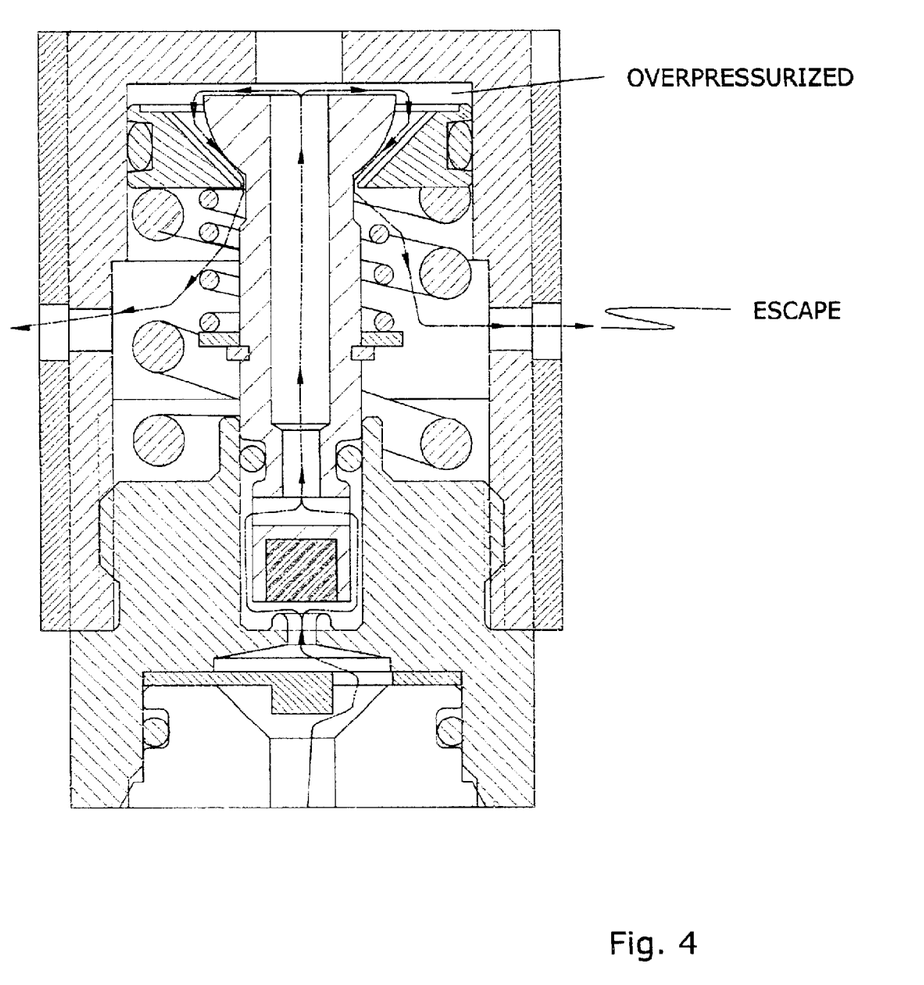
FIG. 4 is a side, elevational cutaway view (partial) of Applicants' device in an over pressurized situation wherein gas from the pressure chamber is bypassing the transfer port, flowing between the stem head and piston head and out the relief ports.

FIGS. 1 and 3 show Applicants' novel pressure regulated fitting (10) with FIG. 1 illustrating a seat closed on the regulated port and FIG. 3 illustrating a seat spaced away from the regulated port showing gas flow therethrough. FIG. 2 illustrates details of Applicants' regulator valve assembly (18) and FIG. 4 illustrates Applicants' novel fitting in an over pressurization mode in which the safety pressure release mechanism of the regulator valve assembly has vented compressed gas through relief ports (14A) to safely discharge gas from the fitting.

The figures show Applicants' pressure regulated fitting (10) having a body (12), typically machined brass, the body threaded for receipt onto a small, lightweight, cylindrical compressed gas bottle (Cy), as by female threads on the body (12) adapted to male threads on the bottle or as by an adapter. Applicants' body (12) is also threaded for receipt of a cap (14) thereon, the cap also typically machined brass with female threads at a near end thereof for threading tightly in gas sealing relation to the body (12). The cap and body are typically cylindrical with a size capable of easy grasping with the hand. A cover (13), typically made from rubber, plastic or other pliable material is slideably received over the cap and may have a skirt extending below to cover some or all of the body, the cap providing a convenient, comfortable, secure means to grasp the fitting (10) in one's hand.

A regulator or valve assembly (18) (see also FIG. 2) is designed to regulate gas within a pressure chamber (14B) within the cap. When the cap threads to the body, it creates a chamber which will enclose the regulator valve assembly (18) therein. Body (12) includes regulated port (12A). Body (12) threads onto the cylinder (Cy) or an adaptor for threading or otherwise engaging a cylinder which includes a high pressure source (Hi), sandwiching between the body and the high pressure source (Hi). A poppet valve actuator (28) typically being disk shaped and having a poppet valve actuator button (28A) and a port (28B) there through may be used in conjunction with an adaptor if the adaptor has a poppet valve so as to actuate the poppet valve and allow gas to flow into the fitting (10). The function of poppet valve actuator (28) is to engage, when the body is threaded on to the cylinder bottle or adaptor, a poppet valve that typically will control access to compressed gas within the cylinder. Here, the poppet valve is not shown to provide clarity to the rest of the mechanism.

Continuing with reference primarily to FIGS. 1 and 3, it is seen that Applicants' novel pressure regulated fitting (10)

includes a stem valve (20) in a transfer port (14C) of the cap, the stem valve (20) simply being an on/off (unregulated) valve for valving regulated gas through the transfer port to a threaded fitting (26) having a safety blow-tip (26A) at the removed end thereof, which safety blow-tip includes a main port (26C) and crossholes (26B) which provide means for gas to escape therefrom if main port (26C) is blocked.

Stem valve (20) includes an actuator stem (20A) extending therefrom, which actuator stem may be depressed by a plunger (22) shaped to fit closely against the walls of the removed end of the cap and capable of slidably sealing (see O-rings (32D)) against the walls of the cap. The plunger in turn is actuated by a lever handle (24) which is pivotally mounted at a near end to the removed end of the cap and which overlays the top of the plunger such that when body (24A) of the handle is engaged with one's fingers and is urged inward (towards the cap), the plunger will depress, which in turn will depress actuator stem (20A) and allow regulated gas to move from the transfer port through the stem valve into threaded fitting (26). Note how threaded fitting (26) and handle engage such that upward movement of the plunger is limited by the handle, as the handle can only pivot a limited distance, the handle having a large hole through which the threaded fitting extends, the treaded fitting extending also into the cap, but the threaded fitting including a large nut (27) on the outside of the handle to limit the handle movement away from the cap. Thus, the threaded fitting serves the function of porting gas valved through the stem valve to a safety blow-tip (26A) while also providing support and position for the handle. Note that O-ring (35E) may be provided upstream of crossholes (26B) so that the removed end of threaded fitting (26) may receive, for example, a threaded hose (40) for seating against the O-ring and for supplying the valved, regulated gas to a remote hose end, for use, for example, in filling a tire of an automobile or other vehicle.

Turning now to FIG. 2, details of the manner in which Applicants' regulator or valve assembly (18) operates may be appreciated. While the discussion which follows will primarily focus on FIG. 2, it will be helpful to reference FIGS. 1, 3 and 4 for the various modes in which Applicants' novel regulator or valve assembly (18) may operate. The function of Applicants' regulator or valve assembly (18) is to provide regulated gas to the outlet of the threaded fitting and to further provide a safety bypass for any over pressurization occurring within the cap.

For example, assume that Applicants' novel pressure regulated fitting (10) is adapted to be threadably received onto a cylindrical aluminum 12-inch×2½-inch bottle containing $CO_2$ under about 1500 psi. By choosing a proper primary spring (18I), Applicants' may set the pressure at the threaded fitting at, say, 100 pounds per square inch. The way this is done is by providing a regulator or valve assembly (18) operated in the manner set forth as follows. FIG. 2 illustrates a cylindrical piston head (18A) having inwardly canted inner walls with a rubber seat or other possible (18B) bonded thereto. The inner walls of the piston head will receive a valve stem (18C) snugly thereon, the valve stem including a stem head (18E) shaped to sit snugly against the rubber seat (18B), the stem head (18E) sitting atop a long stem rod (18D). The stem head is sealed with an O-ring against inner sidewalls of the cap. The stem rod and stem head have a channel (18F) therein for the transport of gas from one end of the valve stem to the stem head. A valve stem seat (18G) may be made from a hard rubber or other suitable material and will engage walls defining regulated port (12A) of body (12). A clip and washer assembly (18H) is provided for engagement with a groove along the side walls of the stem typically rod about midway between stem seat (18G) and stem head (18E). The clip and washer assembly functions to engage a secondary spring (18J) which is captured at one end to the base or underside of the piston head (18A) and the other end to the stem rod such that, when the secondary spring is under compression, it will snugly seat the stem head (18E) against rubber seat (18B) of piston head (18A) to hold the valve stem and piston head together as a single unit. The entire assembly is designed to engage the chamber created by threading the body to the cap as illustrated in FIGS. 1, 3 and 4 so the primary spring (18I) will engage the body at a near end and the underside of the piston head of the removed end to force the piston head against a preload spring (30) and to a bias position, holding stem seat (18G) spaced apart from walls defining the regulated port (12A). However, gas flowing through the regulated port and through stem channel (12F) into pressure chamber (14B) will soon overcome the pressure of primary spring (18I) and seat the valve seat against the regulated port, thereby shutting off the regulated port. At some point, the user will depress the handle which will valve gas through the safety blow-tip, relieving pressure in the pressure chamber (14B) to a point where primary spring (18I) will again valve gas into pressure chamber (14B).

If there is an overpressure situation, caused, for example, by a failure in the seat/regulated port interface, and too much pressure builds up in pressure chamber (14B), then such overpressure will unseat the stem head (18E) from piston head (18A) (see FIG. 4) and allow gas to evacuate the chamber through relief ports (14A).

Figure 5:
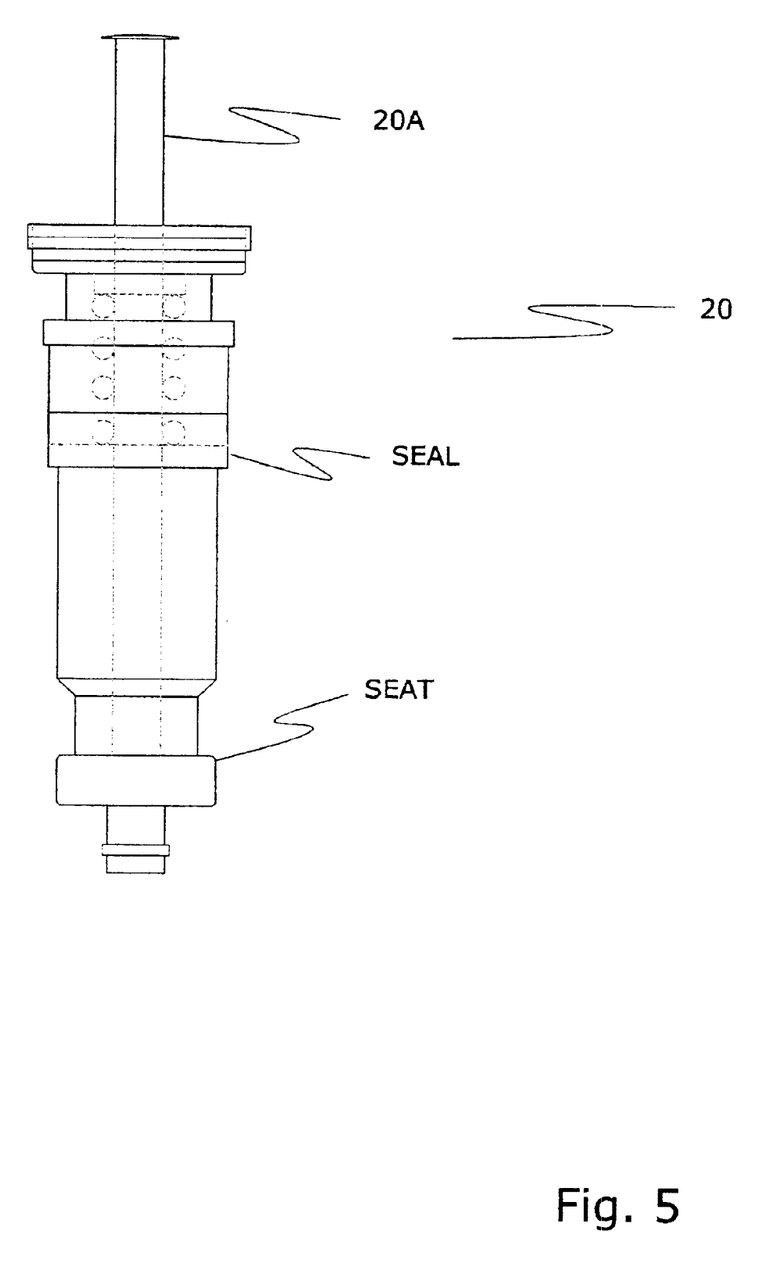
FIG. 5 is a side elevational view of a stem valve that would be suitable for engagement with the transfer port of Applicants' novel invention, the stem valve apart from the device.

FIG. 1 also discloses a flexible hose (40) with, at a near end, a fitting for threadable attachment to the safety blow tip (26A). At the removed end of flexible hose (40), there may be an on/off valve (40A) such as a ball chuck valve for engagement with a valve for inflating a tire. FIG. 5 illustrates a valve (20), such as a stem valve, for engagement with the transfer port for control (on/off) of gas flowing through the transfer port to the blow tip. Actuator stem (20A) extends from the valve for engagement with the plunger so that when the handle is depressed and the plunger is activated or depressed, valve (20) will allow the gas to flow through the transfer port to the blow tip.

Figure 6:
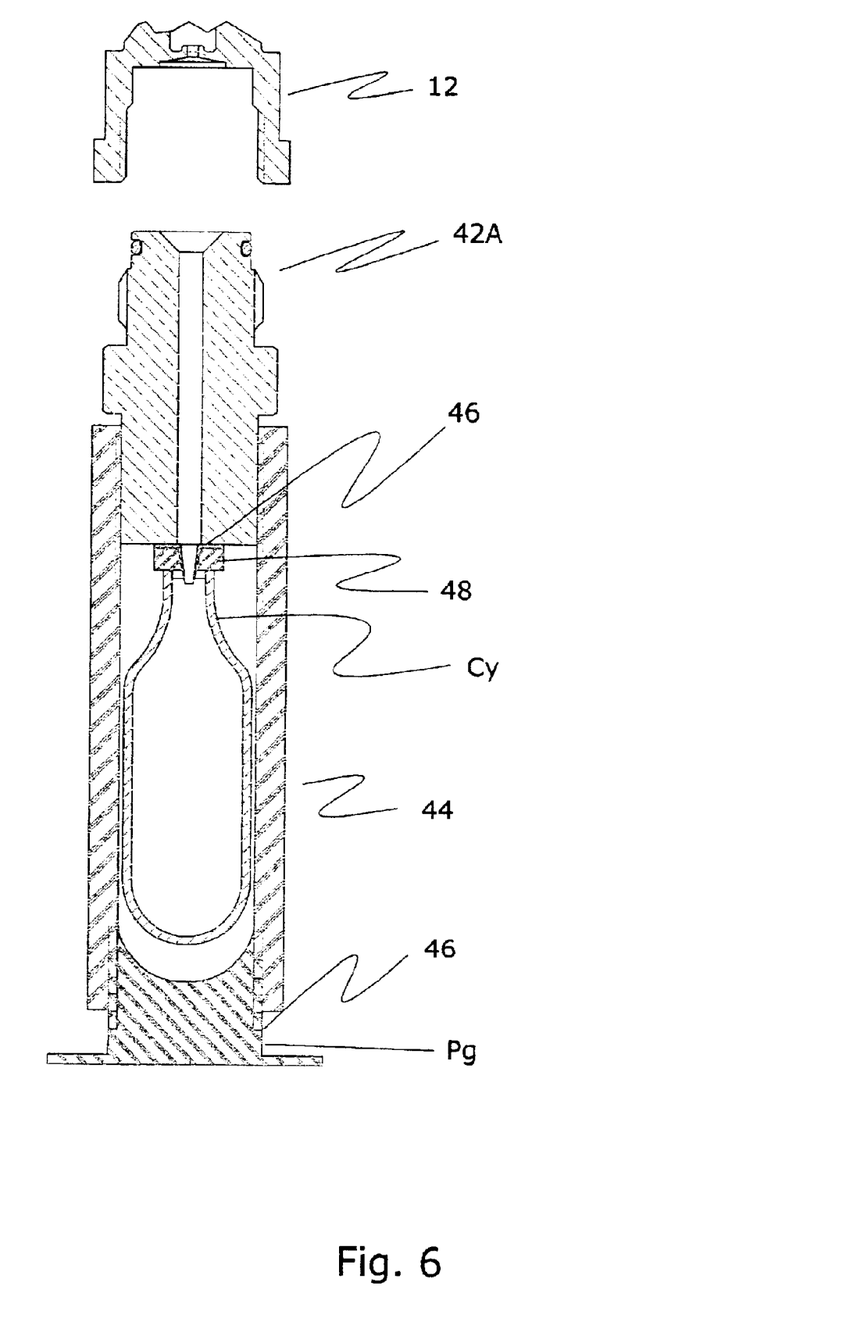
FIG. 6 illustrates a side elevational view, cutaway, of an adaptor for adapting Applicants' novel fitting, the adaptor to engage an unthreaded, disposable cylinder bottle for regulating gas received therefrom.
Figure 7:
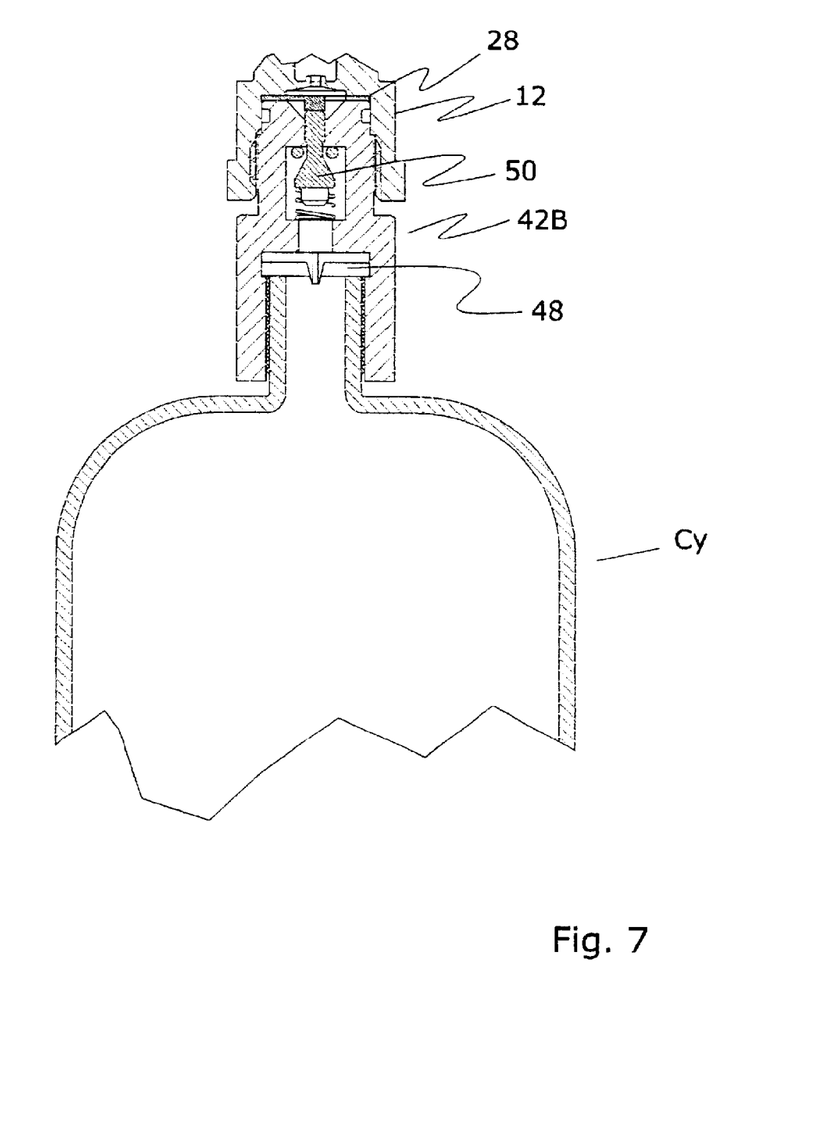
FIG. 7 is a partial view of a threaded, disposable pressurized gas cylinder illustrating a preferred embodiment of an adaptor for use with Applicants' novel fitting, the adaptor for puncturing a membrane on the cylinder and for receipt upon the cylinder by threaded engagement, the adaptor further including a poppet valve therein.
Figure 8:
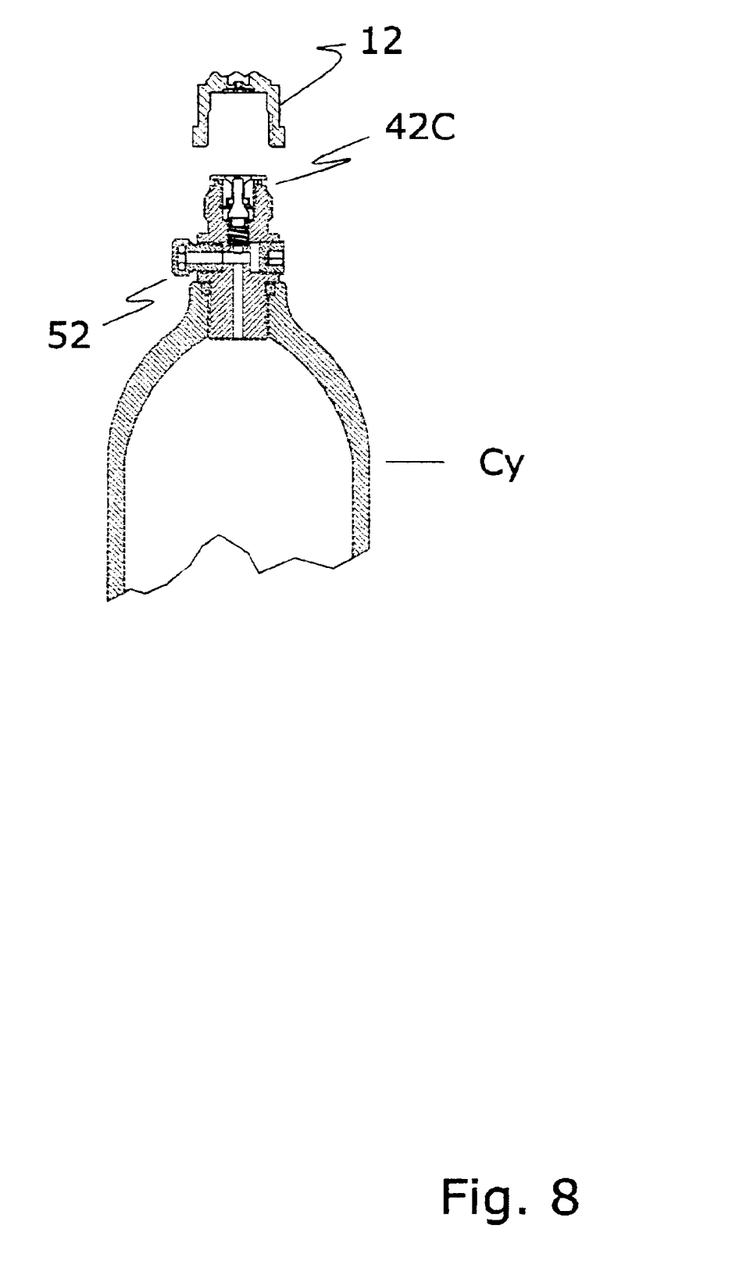
FIG. 8 illustrates yet another preferred embodiment of Applicants' adaptor, this adaptor engageable to a refillable (valved) compressed gas cylinder.

Up FIGS. 6, 7 and 8 all illustrate variations of an adapter (42A, 42B and 42C) (FIGS. 6, 7 and 8, respectively). All variations of the adapter are designed to receive threads from body (12) and engage, in a variety of ways, a compressed gas source. FIG. 6, for example, indicates adapter (42A) with threads on both ends thereof, threads to engage the body and threads to engage, at a removed end of adapter (42A), a holder (44), typically hard plastic and cylindrical, for receipt of a disposable gas cylinder body therein. The holder includes, at a removed end thereof, a threadable plug (46). The near end of holder (44) is threaded for receipt of adapter (42A) thereon. Adapter (42A) may include a nipple (46) to pierce a sealed membrane (48) on the cylinder bottle. Thus, FIG. 6 illustrates an adapter (42A) that may receive Applicants' novel device (10) thereon so as to adapt device (10) for receipt of compressed gas from a disposable (unthreaded) compressed gas bottle.

Turning to FIG. 7, Applicants are seen to provide a second embodiment of an adapter (42B), which also contains a nipple (46) for the piercing of the membrane (48) of a cylinder bottle (Cy). However, Applicants' adapter (42B) includes threads for engaging threads on the neck of the cylinder bottle. Further, it may contain a poppet valve assembly (50) so that when adapter (42B) is threaded to cylinder (CY) and nipple (46) pierces membrane (48), gas will be contained within bottle of the adapter until poppet valve (50) is depressed. When embodiment of adapter (42B) is used, Applicants typically provide poppet valve actuator (28) for engagement with body (12) so as to depress poppet valve (50) when body (12) is threaded on to adapter (42B).

FIG. 8 illustrates a third embodiment of Applicants' adapter (42C), which also contains a poppet valve (in body (12) including poppet valve actuator (28)). However, this embodiment of adapter (42C) may include threads for engagement with threads of a cylinder, but instead of a nipple for piercing a membrane, may include a valve (52) capable of refilling the cylinder. Indeed, this embodiment of Applicants' adapter (42C) is designed to be received onto a refillable cylinder and is designed to be valved, to refill the cylinder and body (12) is designed to have threads for engaging such an adapter (42C).

The preferred length of the cap and body assembly (not including adapter), with cover on, is about three and one-half inches (range two inches to six inches). The preferred diameter of the cap and body together, with cover on, is one and one-eighth inch (range three-quarter inch to two and one-quarter inch). The cover may be molded to include scallops or indents for placement of individual fingers.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. An apparatus for valving gas from a compressed gas bottle, the apparatus comprising:
    a body for the receipt of gas from the compressed gas bottle, the body including walls defining a regulated port;
    an elongated cap having means to engage the body, the cap having inner walls defining a cylindrical chamber and a transfer port;
    a regulator valve assembly for engagement with the cylindrical chamber of the body for regulating gas pressure at the regulated port wherein the regulator valve assembly includes means to vent gas from the cylinder chamber when the gas exceeds a preselected maximum;
    walls defining a transfer part containing a valve for the control of gas therethrough the transfer port in fluid communication with an outlet port;
    a handle; and,
    means to engage the handle to the valve such that movement of the handle moves the valve between an open and closed position;
    wherein the cap and handle are adapted to be held in ones hand so the handle may be activated by ones fingers.

2. The apparatus of claim 1 wherein the regulator valve assembly includes a piston head and a valve stem, the valve stem having a stem head and a stem rod, the valve stem having a channel therethrough, the stem for seating against the inner walls of the piston head and wherein the means to vent gas from the cylinder chamber includes a spring engaging the stem rod and an underside of the piston head for urging the piston head against the stem head.

3. The apparatus of claim 2 wherein the regulator valve assembly further includes a preload spring acting on the piston head, urging the piston head towards the regulated port.

4. The apparatus of claim 2 further including a pliable member defining the inner walls of the piston head.

5. The apparatus of claim 1 wherein the outlet port contains a blow tip.

6. The apparatus of claim 5 wherein the blow tip includes an "O" ring upstream thereof.

7. The apparatus of claim 1 wherein the elongated cap includes a pliable cover.

8. The apparatus of claim 1 further including an adapter to engage the body, the adapter including a poppet valve activator and a means for piercing a disposable cylinder.

9. The apparatus of claim 1 further including an adapter, the adapter including walls for engaging the body, the adapter including a poppet valve actuator and threads, the threads for engagement with a cylinder bottle.

10. The apparatus of claim 1 further including an adapter, the adapter including means to engage an unthreaded compressed gas cylinder and the adapter also including means to pierce an unthreaded cylinder.

11. The apparatus claim 1 wherein the handle comprises a lever, the lever pivotally attached to the cap.

12. The apparatus of claim 11 wherein the means to engage the handle and the valve includes a plunger.

13. The apparatus of claim 1 further including a flexible hose, the flexible hose for connecting to the outlet port.

14. The apparatus of claim 13 wherein the flexible hose includes a removed end, the removed end of the hose containing a ball chuck valve.

15. An assembly for providing valved, high-pressure gas, the assembly comprising:
    a cylindrical compressed gas bottle having a neck;
    a cylindrical, regulated gas valve mechanism, engageable to the neck, the cylindrical regulated gas valve mechanism having a body and cap assembly including a plunger at a removed end of the body and cap assembly the cylindrical regulated gas valve mechanism having a regulated port for receipt of gas from the cylindrical, compressed gas bottle, an outlet port having valve means to control the passage of gas therethrough and a means to regulate the pressure at the outlet port; and
    a handle for operative engagement with the plunger of the cylindrical regulated gas valve mechanism, for activation of valve means, the handle capable of being finger operated when a hand is engaged with the cylindrical, regulated gas valve mechanism.

16. The assembly of claim 15 wherein the handle is a lever for pivotal engagement with the cap, at a removed end thereof.

17. The assembly of claim 15 wherein the cylindrical, regulated gas valve mechanism includes a cover.

18. The assembly of claim 15 wherein the means to regulate the pressure at the outlet port includes a piston and a spring.

19. The assembly of claim 15 wherein the cylindrical regulated gas valve mechanism includes threads for adapting to the neck of the cylindrical compressed gas bottle.

20. The assembly of claim 15 further including a member with an open tip, generally perpendicular to the cylindrical, regulated gas valve mechanism and in fluid communication with the outlet port when the handle activates the valve means.

* * * * *